(12) United States Patent
Mehta et al.

(10) Patent No.: US 8,388,024 B2
(45) Date of Patent: Mar. 5, 2013

(54) DOUBLE MAILER INTERMEDIATE

(75) Inventors: Rajendra Mehta, Dayton, OH (US);
Thomas Furey, Bellbrook, OH (US);
Amit Chaudhary, Vicksburg, MS (US);
David Washburn, Kettering, OH (US);
Courtney Allen, West Orange, NJ (US)

(73) Assignee: The Standard Register Company, Dayton, OH (US)

( * ) Notice: Subject to any disclaimer, the term of this patent is extended or adjusted under 35 U.S.C. 154(b) by 794 days.

(21) Appl. No.: 12/360,317

(22) Filed: Jan. 27, 2009

(65) Prior Publication Data

US 2010/0187293 A1 Jul. 29, 2010

(51) Int. Cl.
*B42D 15/00* (2006.01)
(52) U.S. Cl. .......................................... 283/72; 229/92.8
(58) Field of Classification Search .................... 283/58, 283/67, 70, 94; 229/92.8; 359/580
See application file for complete search history.

(56) References Cited

U.S. PATENT DOCUMENTS

| | | | |
|---|---|---|---|
| 4,554,565 A | | 11/1985 | Kito et al. |
| 5,029,901 A | * | 7/1991 | Dotson et al. ..................... 462/55 |
| 5,636,874 A | * | 6/1997 | Singer ............................... 283/94 |
| 5,667,134 A | * | 9/1997 | Olson et al. .................... 229/92.8 |
| 5,695,808 A | * | 12/1997 | Cueli ................................. 427/9 |
| 5,826,915 A | | 10/1998 | Gregory, Jr. |
| 5,873,604 A | | 2/1999 | Phillips |
| 6,413,305 B1 | | 7/2002 | Mehta et al. |
| 6,481,753 B2 | * | 11/2002 | Van Boom et al. .............. 283/72 |
| 6,534,158 B2 | * | 3/2003 | Huang et al. .................. 428/201 |
| 6,665,406 B1 | * | 12/2003 | Phillips ............................ 380/54 |
| 7,758,078 B2 | * | 7/2010 | Keller .............................. 283/72 |
| 2005/0103830 A1 | | 5/2005 | Salerno et al. |
| 2008/0050540 A1 | * | 2/2008 | Christofer et al. ............... 428/13 |
| 2010/0264640 A1 | * | 10/2010 | Lane et al. ....................... 283/67 |

OTHER PUBLICATIONS

Bond, M. et al.; Laser-printed PIN Mailer Vulnerability Report; http://www.cl.cam.ac.uk/users/sjm217/papers/cl05pinmailer-vuln.pdf.

* cited by examiner

*Primary Examiner* — James Kramer
*Assistant Examiner* — Christopher e Veraa
(74) *Attorney, Agent, or Firm* — Dinsmore & Shohl LLP

(57) ABSTRACT

A mailer intermediate, foldable into postcard size, includes a generally rectangular sheet of card stock having first and second side edges, first and second end edges, and first and second faces. A fold line extends substantially transverse to the side edges and substantially bisecting them, and dividing the sheet into first and second portions. An adhesive pattern on the first face of the sheet, adjacent at least one of the first and second end edges, secures the first and second portions together adjacent the first and second end edges. An obscuring coating and a camouflage image are provided on the first face of the sheet. Variable indicia are printed on the obscuring coating, and are not legible when viewed by an observer who separates the first and second portions while the first and second portions remain secured together adjacent the first and second end edges. The obscuring coating may comprise a multi-layer, thermochromic coating. Alternatively, the obscuring coating may comprise a reflective coating.

6 Claims, 7 Drawing Sheets

Dear Mr Dooley:
A message is contained in the blue box below concerning one of your accounts. The message can be viewed by warming the blue panel by holding the card flat against the palm of your hand, by breathing on it, or by rubbing it briskly.

Account No. 987233-2
Jed Dooley
5/5/2008
Draft # 3806
Your account has been charged $30.00 for non-sufficient funds.    Overdraft $653.41

FIG. 3B

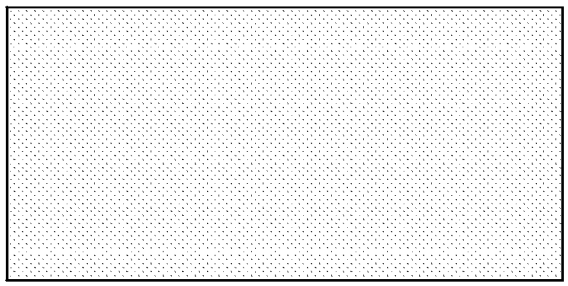
Layer 1 – Solid-tint Thermochromic ink
FIG. 4A
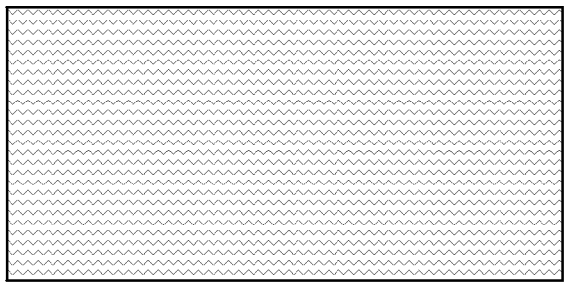
Layer 2 – Wavy lines of press ink (not heat sensitive)
FIG. 4B
Layer 3 – Camouflage pattern of Thermochromic ink
FIG. 4C
Account No. 987233-2
Jed Dooley
5/5/2008
Draft # 3806
Your account has been charged $30.00 for non-sufficient funds.
Overdraft
$653.41
Layer 4 – Hidden Indicia printed in blue toner
FIG. 4D

DOUBLE MAILER INTERMEDIATE

CROSS-REFERENCE TO RELATED APPLICATIONS

Not applicable.

STATEMENT REGARDING FEDERALLY SPONSORED RESEARCH OR DEVELOPMENT

Not Applicable.

BACKGROUND OF THE INVENTION

This relates to a V-fold double mailer intermediate, such as a double postcard, that contains variable information printed inside, and provides a measure of privacy for the printed variable information. Double postcards have been in use for a number of years. Such a double postcard is shown in U.S. Pat. No. 5,667,134, issued Sep. 16, 1997 to Olsen et al. The '134 patent teaches a V-fold double postcard that includes a negotiable check on one of the two postcard panels. The two postcard panels are held together at the end edges by adhesive. While providing confidentiality for information printed on the inside surfaces of the postcard, the construction of the '134 patent cannot be mailed at the postcard rate.

Effective Feb. 5, 2004, the U.S. Postal Service revised its *Domestic Mail Manual* (DMM) C100.2.9 to clarify standards governing the content and sealing of double postcards. According to these standards, only the top or bottom of a double postcard, once folded, may be sealed. Double postcards may not be sealed against inspection and are to be configured so that they can be examined to ensure that the reply half does not include an additional message. Therefore, sealing of the sides of double postcards, regardless of method, is not permitted.

The text of DDM C100.2.9, entitled "Double Cards," is as follows:

A double card (i.e., a double stamped card or double postcard) consists of two attached cards, one of which is designed to be detached by the recipient and returned by mail as a single card. Double cards are subject to these standards:

a. The reply half of a double card must be used for reply only and may not be used to convey a message to the original addressee or to send statements of account. The reply half may be formatted for response purposes (e.g., contain blocks for completion by the addressee).

b. A double card must be folded before mailing and prepared so that the address on the reply half is on the inside when the double card is originally mailed. The address side of the reply half may be prepared as business reply mail, courtesy reply mail, meter reply mail, or as a merchandise return service label.

c. Plain stickers, seals, or a single wire stitch (staple) may be used to fasten the open edge at the top or bottom once the card is folded if affixed so that the inner surfaces of the cards can be readily examined. Fasteners must be affixed according to the applicable preparation requirements for the rate claimed. Any sealing on the left and right sides of the cards, no matter the sealing process used, is not permitted.

d. The first half of a double card must be detached when the reply half is mailed for return. (Emphasis added).

One difficulty caused by compliance with the DDM is that the double postcard is not as secure as may be desired for some applications. In order to obtain the postcard postage rate, the sides of the cards must be left unsealed. This permits the interior of the double postcard to be inspected by a prying individual who separates the two panels of the double postcard along the side edges, and views the information printed on interior surfaces. It is highly desirable to keep information that is printed on those interior surfaces confidential, even if the postcard interior is subject to inspection.

SUMMARY OF THE INVENTION

A foldable mailer intermediate includes a generally rectangular sheet of card stock having first and second side edges, first and second end edges, and first and second faces. A fold line extends substantially transverse to the side edges and substantially bisects them, dividing the sheet into first and second portions. An adhesive pattern on the first face of the sheet, adjacent at least one of the first and second end edges, secures the first and second postcard portions together adjacent the first and second end edges. An obscuring coating and a camouflage image on the first face of the sheet prevent variable indicia, printed on the obscuring coating, from being legible when viewed by an observer who separates the first and second portions adjacent one of the first and second side edges and observes the variable printed indicia while the first and second portions remain secured together adjacent the first and second end edges.

The obscuring coating may comprise a multi-layer, thermochromic coating. The camouflage image may comprise a layer of thermochromic ink in the thermochromic coating to obscure the variable indicia. The thermochromic coating may comprise a full tint layer of thermochromic ink, a pattern print of conventional press ink, and a pattern print of thermochromic ink. The variable indicia are printed on top of the thermochromic coating.

The obscuring coating may comprise a reflective coating. The camouflage image may comprise an image printed on the first face of the sheet such that it is reflected from the reflected coating to an observer who separates the first and second portions adjacent one of the first and second side edges and observes the variable printed indicia while the first and second portions remain secured together adjacent the first and second end edges. The obscuring, reflective coating on the first face of the sheet may be positioned on one of the first and second portions, with the camouflage pattern being printed on the first face of the sheet on the other of the first and second portions. The camouflage pattern may be return address information, and the obscuring, reflective coating may comprise a piece of reflective tape applied to the first surface.

BRIEF DESCRIPTION OF THE DRAWINGS

FIGS. 3A and 3B show the interior of one embodiment of the double postcard having a thermochromic coating after the postcard has been opened, before and after warming, respectively;

FIGS. 4A-4D illustrates the layers of the thermochromic coating and the variable indicia;

DETAILED DESCRIPTION OF THE PREFERRED EMBODIMENTS

Figure 1:
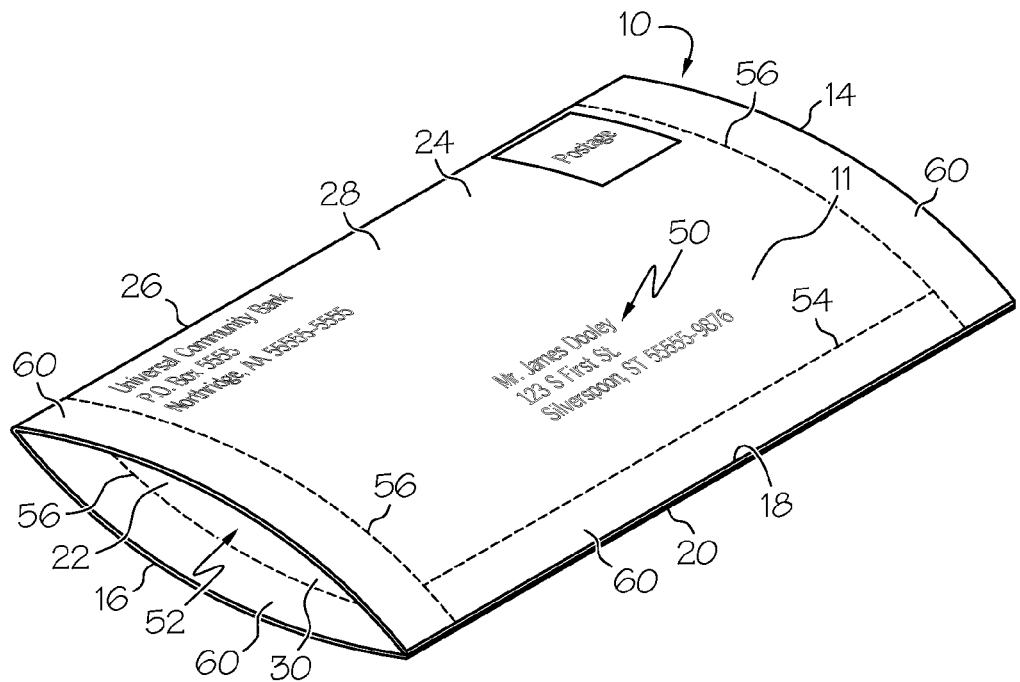
FIG. 1 is a perspective view of a V-folded, double postcard, exhibiting a gap between the mailer panels.
Figure 2:
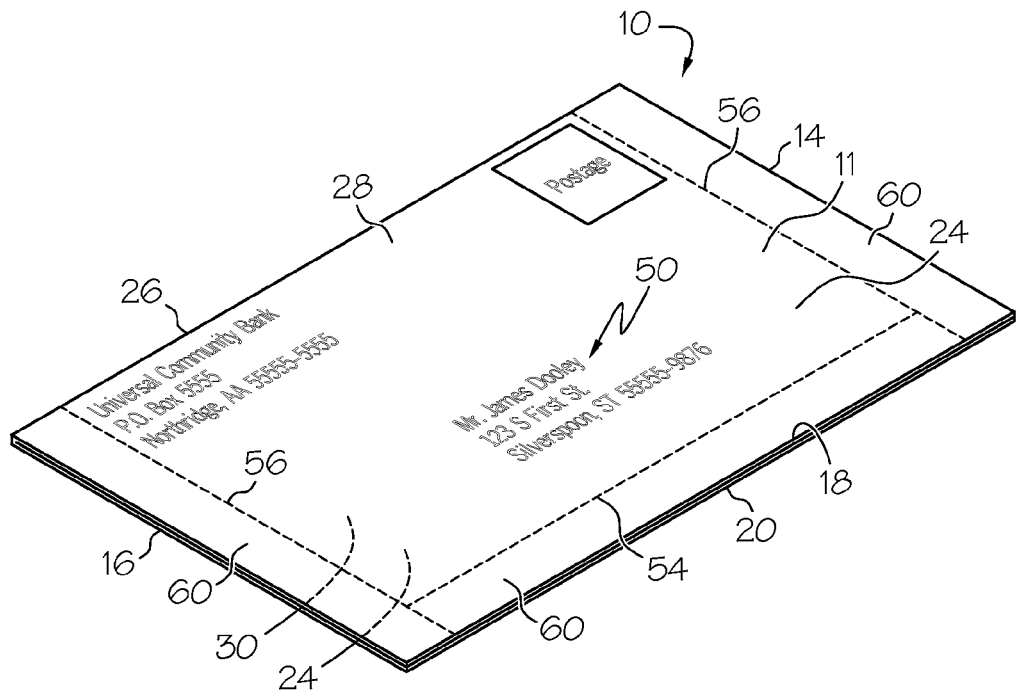
FIG. 2 is a perspective view of the V-folded double postcard of FIG. 1, illustrating its appearance when the panels are not flexed to produce a gap between the panels.

Reference is made to FIGS. 3-6 of the drawings, showing embodiments of mailer intermediates that are constructed so that they can be folded, as illustrated in FIGS. 1 and 2. As discussed above, if the mailer is appropriately sized, it can qualify for postcard postal rates. It should be appreciated, however, that although a double postcard is illustrated and discussed, below, the invention is not limited to double postcard constructions, but is also be applicable to larger mailers. Postal regulations require that double postcards of this type may not be sealed against inspection in order to qualify for lower postal rates. Rather, it must be possible for postal authorities to examine such double postcards after they are sealed to insure that the reply halves of the postcards do not include any additional messages. Therefore, it is necessary that such a double postcard, when folded and sealed as shown in FIG. 2, still permits postal authorities to spread apart the side edges, as shown in FIG. 1, indicated with numeral 52. It will be appreciated that users of such postcards would like to be able to shield the content of messages printed on the interior surface of the postcard from inspection by third parties to whom the double postcard is not addressed. It is also desirable to shield the content of messages printed on the interior surfaces of larger, folded mailers. This objective is accomplished in the embodiments described below.

The foldable mailer intermediate shown in FIGS. 1 and 2 includes a generally rectangular sheet 11 of card stock having first and second side edges 14 and 16, first and second end edges 18 and 20, and first and second faces 22 and 24. A fold line 26 extends substantially transverse to the side edges 14 and 16, and substantially bisects them. The sheet may be folded along the fold line 26 dividing the sheet into first and second portions 28 and 30. The first and second portions 28 and 30 are preferably of substantially the same dimension. An adhesive pattern (not shown in FIGS. 1 and 2) is positioned on the first face 22 of the sheet 11, adjacent at least one of the first and second end edges 18 and 20. The adhesive pattern, which secures the first and second postcard portions 28 and 30 together adjacent the first and second end edges 18 and 20, may be pressure sensitive adhesive, or remoist adhesive. It should be appreciated, however, that other types of adhesive, as well as staples, adhesive tape, and other devices, may be used to secure the first and second end edges 18 and 20 together.

The sheet 11 of card stock may be dimensioned so that when it is folded about the fold line 26, as illustrated in FIGS. 1 and 2, the resulting mailer has postcard size dimensions. Prior to folding the sheet 11, both sides of the sheet are printed with information. Outgoing addressee indicia 50 are imaged on the second face 24 of the first postcard portion 28 of the sheet 11. Return addressee indicia (not shown in FIGS. 1 and 2) are imaged on the first face 22 of the second postcard portion 30 of the sheet 11. Additional information may be printed on the first face 22 of the first portion 28. The generally rectangular sheet of printable stock may comprise any suitable material. Examples include 38# postal ledger stock, 65# cover stock, 90# index stock, 100# tab card stock, 100# tag stock, 110# index stock, and 125# tag stock. Perforation lines 54 adjacent to the first and second ends 18 and 20, and perforation lines 56, adjacent to the first and second side edges 14 and 16, together define margin portions 60.

Figure 3A:
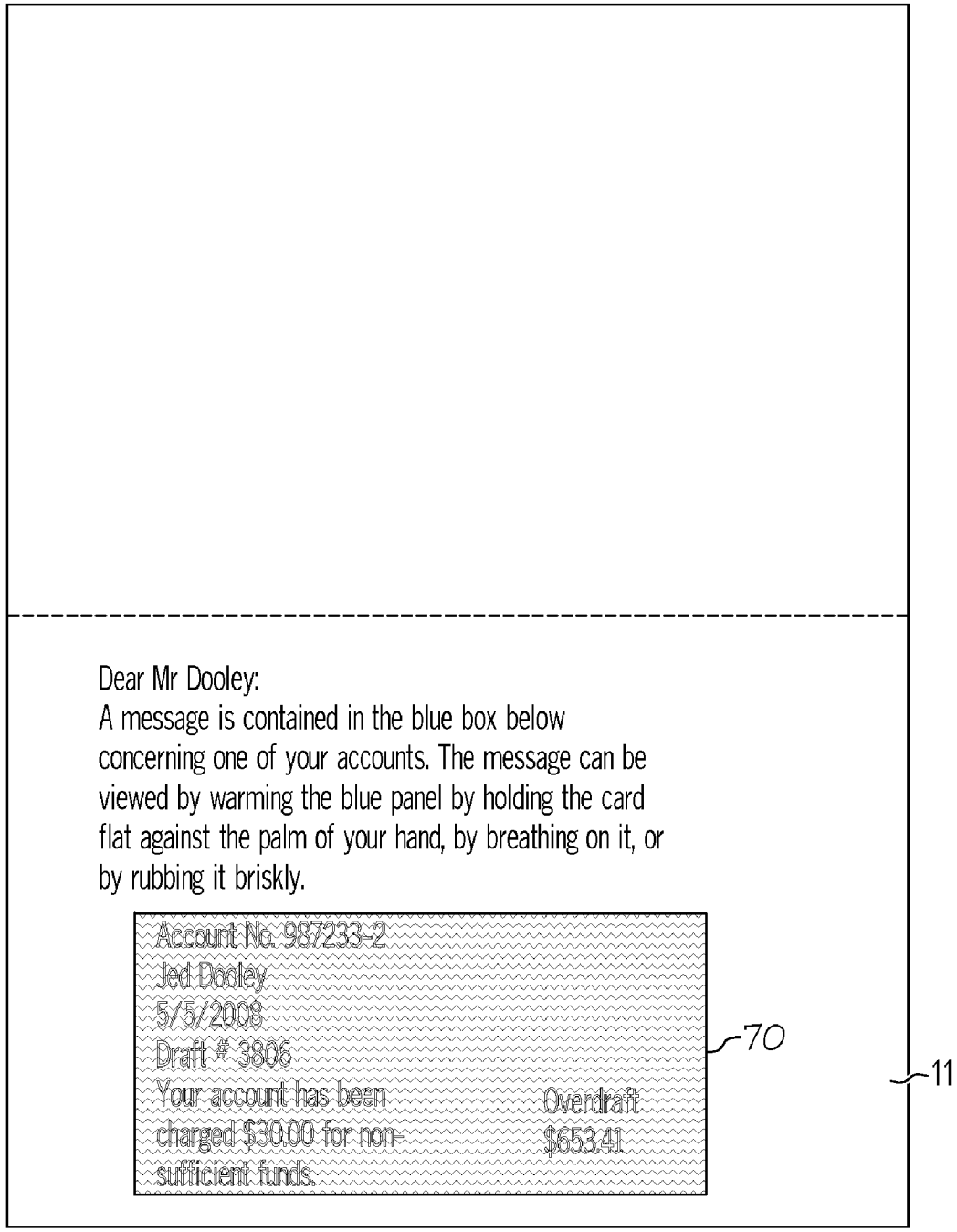

FIGS. 3A and 3B illustrate a mailer intermediate of one embodiment after the margin portions have been removed and the mailer opened. FIG. 3A shows the mailer before warming and FIG. 3B shows the mailer after warming. In this embodiment, an obscuring, thermochromic coating 70 is provided on the first face of the sheet 11. The message that is to be maintained in confidence is printed on top of the thermochromic coating 70 in such a manner as to render the message illegible. After the mailer intermediate is printed, folded, and sealed, a casual observer who looks into the mailer without unsealing the mailer, as indicated at 52 in FIG. 1, will not be able to read the variable information that has been printed on the thermochromic coating 70. When the addressee receives the mailer, opens it, and warms it, the hidden message or information will become legible. Warming may be effected by holding the mailer against the viewer's skin, by the viewer breathing on the coating, by rubbing the mailer briskly, or in any other convenient manner. FIGS. 3A and 3B illustrate a construction in which the coating 70 covers only a part of the first face of the sheet 11. If desired, however, half or even all of the first face of the sheet 11 may be covered with the coating 70.

It is preferable that the thermochromic coating be a multilayer thermochromic coating. One embodiment of the layers for such a coating is illustrated in FIGS. 4A, 4B, 4C, and 4D. FIG. 4A represents a first layer of a thermochromic ink. This may, for example, be a thermochromic ink printed as a full tint, i.e. a layer of thermochromic ink that completely covers the surface area. Alternatively, this may be printed as less than a full tint, i.e., as a screen of spots or other shapes. The thermochromic ink has a first color at ambient temperatures and changes to a second color or becomes colorless at elevated temperatures. FIG. 4B represents a second layer, printed in a second step, which consists of a layer of non-thermochromic conventional ink, printed as a camouflage pattern. A wavy line pattern is illustrated. It will be appreciated, however, that numerous other camouflage patterns are known in the art and may be used instead of the wavy line pattern. The ink used for this layer is typically the same or similar color as the color of the thermochromic ink at ambient temperature. FIG. 4C represents a layer of thermochromic ink printed as a camouflage pattern. This is illustrated as a pattern of numbers, printed over the majority of the area, and is preferably the same color as the thermochromic ink in the first layer. Finally, FIG. 4D shows the variable indicia that make up the fourth layer, printed in conventional ink over the other three layers. This ink may also be similar in color to the color of the thermochromic ink at ambient temperature. Although FIGS. 4A, 4B, and 4C have been described as the first, second and third layers, these three layers can be printed in any order desired. The colors of the layers may be selected, as desired. As stated above, it has been found, however, that printing all four layers with the same color or generally the same color ink is preferable. For example, all three layers may be printed with a blue ink. When the coating is warmed, the layers of FIGS. 4A and 4C change from blue to colorless, and the variable indicia of the layer of FIG. 1D become readily apparent, backed only by the layer of FIG. 4B.

Figure 5A:
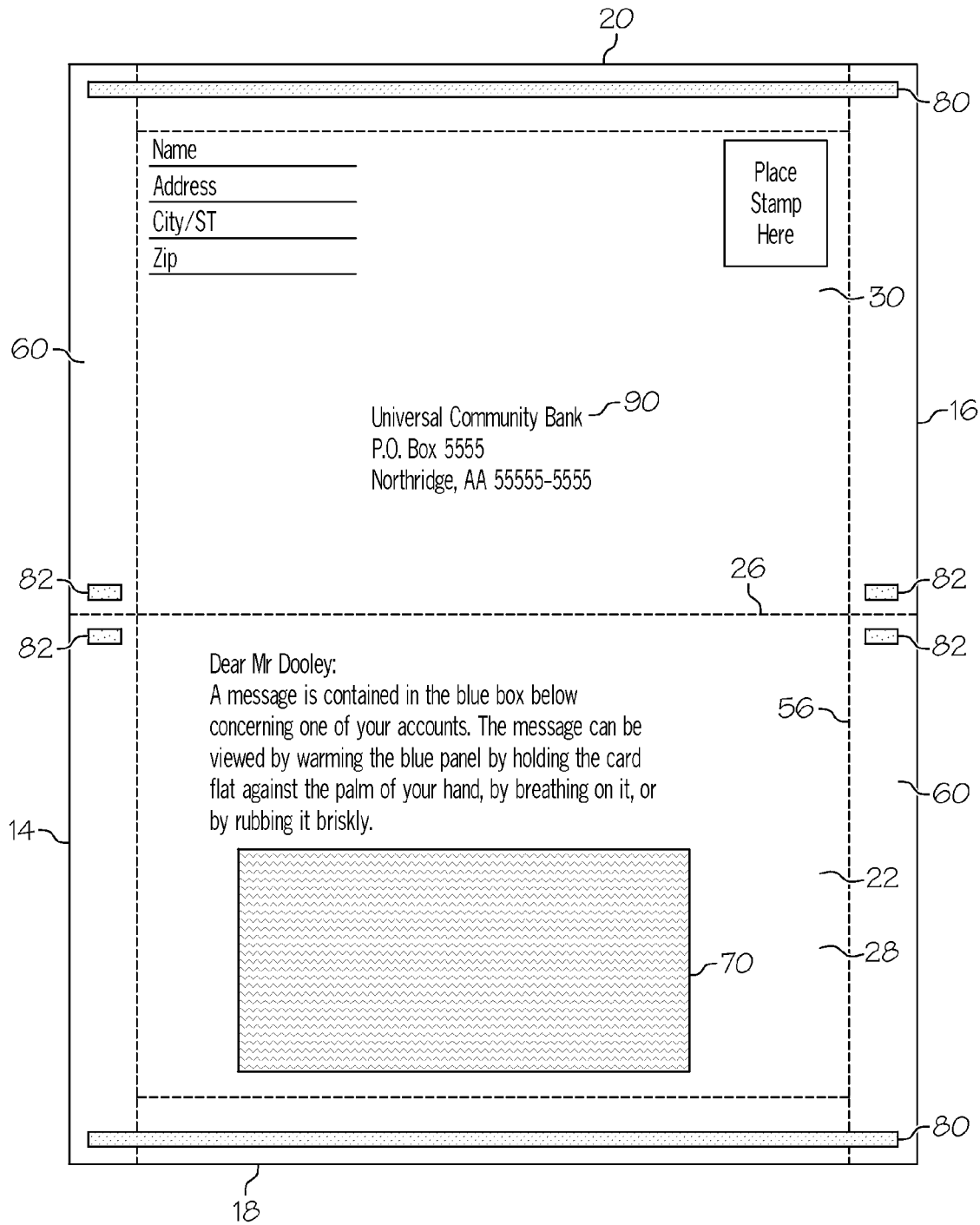
FIGS. 5A and 5B show the two faces of a mailer incorporating a thermochromic coating.
Figure 5B:
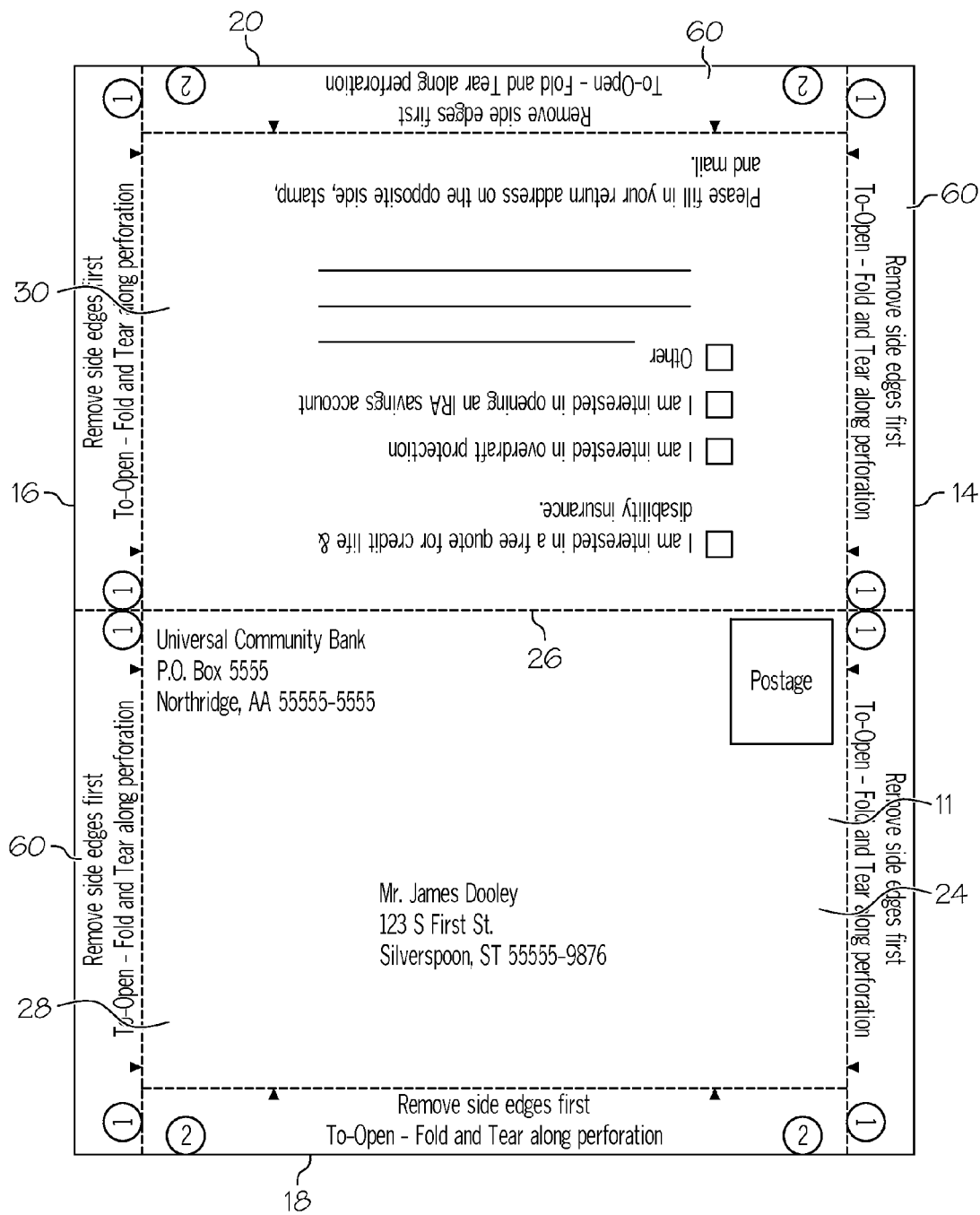

FIGS. 5A and 5B are views, similar to FIGS. 3A and 3B, showing both sides of a mailer intermediate, after it has been printed with variable indicia, but prior to folding and sealing. While the coating 70 includes the variable indicia in FIG. 5A, these indicia are largely obscured from view when viewed from directly above the coating 70. When the coating 70 is viewed at an angle, as suggested in FIG. 1, the variable indicia are obscured even more effectively.

FIGS. 3A, 3B, 5A, 5B, and 6 of the drawings use the same reference numerals to refer to corresponding structures as do FIGS. 1 and 2. The mailer intermediate of FIGS. 5A and 5B includes an adhesive pattern 80 which is depicted as adjacent both of the first and second edges 18 and 20 on the first face 22 of the sheet 11. The two strips of adhesive 80 may, for example, be a cohesive. The two strips of cohesive will adhere readily only to each other, facilitating handling the sheet 11 as variable indicia is printed on the coating 70 by means of an ink jet printer or other printer. It will be appreciated, however, that other pressure sensitive adhesives or remoist adhesives may be used with which only a single strip of adhesive is needed. Alternatively, other types of adhesive, such as hot melt adhesive, may be used. Further, other modes of attachment of the first and second edges 18 and 20 are contemplated, such as staples, or other mechanical attachment mechanisms, adhesive tape, and the like.

Additional spots of adhesive 82 may be provided in the margin 60 to minimize the creation of a gap 52 when the panels 28 and 30 are flexed. The face 22 of panel 30 includes a return address 90 which is preprinted so that the portion 30 can be returned to the sender after it is detached from portion 28.

Figure 6:
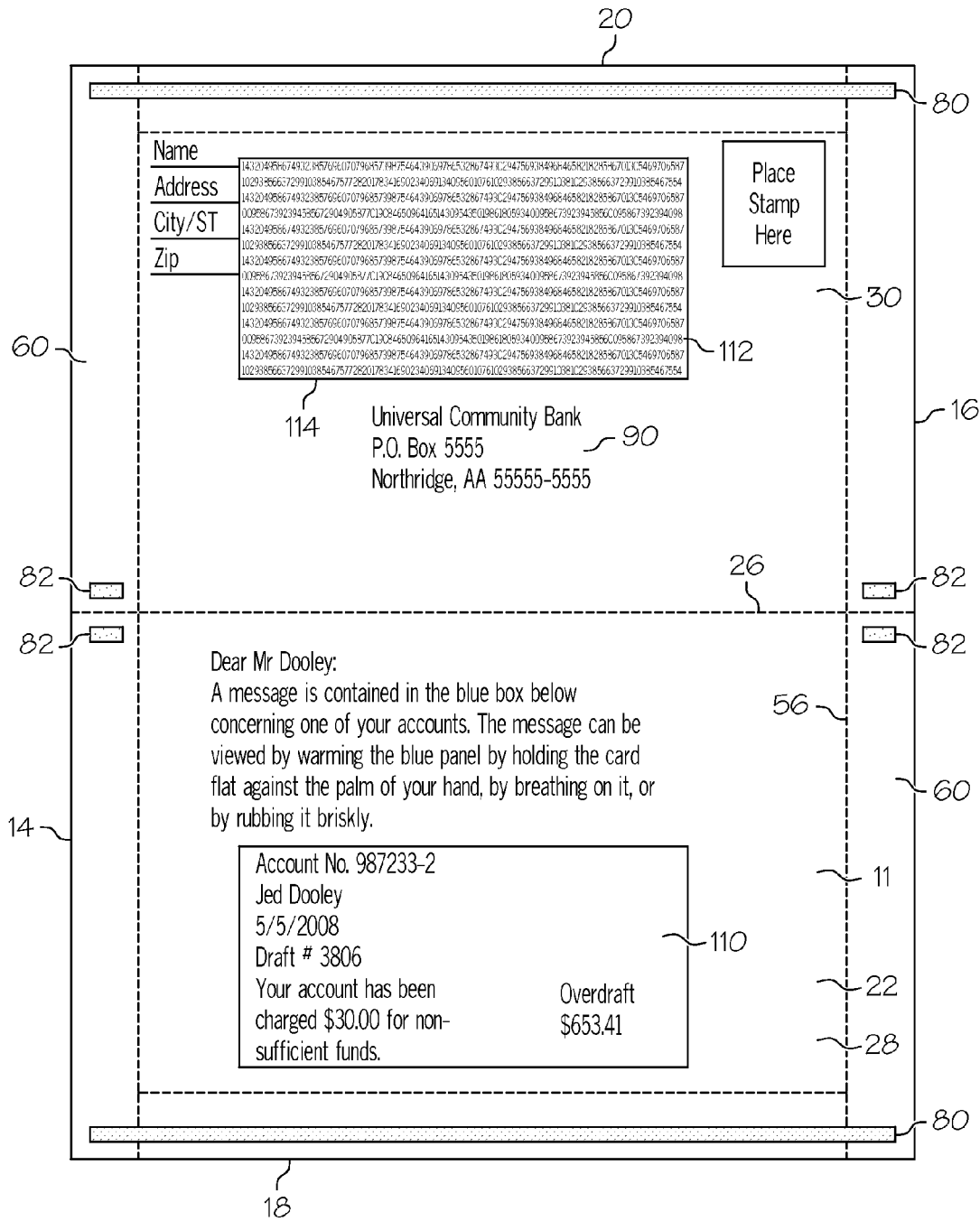
FIG. 6 illustrates the first face of another embodiment of the mailer which utilizes a reflective coating in place of the thermochromic coating.

FIG. 6 shows a second embodiment of the mailer intermediate that is also foldable into a postcard size. In the embodiment of FIG. 6, an obscuring, reflective coating 110 is provided on the first face of the sheet 11. The variable indicia are printed on the obscuring, reflective coating 110 and are not legible when viewed by an observer who separates the first and second postcard portions adjacent one of the first and second side edges 14 and 16 and observes the variable printed indicia while the first and second postcard portions 28 and 30 remain secured together by cohesive 80 adjacent the first and second end edges 18 and 20. The reflective coating 110 may comprise a layer of material such as a reflective plastic tape, or reflective film. The tape may be a metalized Mylar tape or other tape having a smooth, reflective surface. The reflective coating 110 may be a reflective ink which is printed onto the first face of the sheet 11. The reflective coating 110 may cover all or only a portion of the first face of the sheet 11. A camouflage pattern 112 may be printed on the first face of the sheet on the other of the first and second postcard portions, opposite the obscuring, reflective coating 110. This is illustrated in FIG. 6 as an area 114 on which are printed numerical characters. It will be appreciated that other patterns may be used as well. The camouflage pattern 112 further obscures the variable printed indicia when viewed by an observer who separates the first and second postcard portions adjacent one of the first and second side edges 14 and 16, since the image of the camouflage pattern is effectively superimposed over the image of the variable indicia that are printed on the reflective coating 110. If desired, the postcard return address information may be moved to the portion of area 114, and may act as the camouflage image.

While certain representative embodiments and details have been shown for purposes of illustrating the invention, it will be apparent to those skilled in the art that various changes in the apparatus disclosed herein may be made without departing from the scope of the invention, which is defined in the appended claims.

What is claimed is:

1. A foldable mailer intermediate, comprising:
   a generally rectangular sheet of card stock having first and second side edges, first and second end edges, and first and second faces;
   a fold line extending substantially transverse to said side edges and substantially bisecting them, whereby said sheet is divided by said fold line into first and second portions;
   an adhesive pattern on said first face of said sheet, adjacent at least one of said first and second end edges, for securing said first and second portions together adjacent said first and second end edges,
   a camouflage pattern printed on said first face of said first portion of said sheet, and
   an obscuring, reflective coating on said first face of said second portion of said sheet such that the image of said camouflage pattern is reflected from said reflected coating to an observer who separates said first and second portions adjacent one of said first and second side edges and observes said variable printed indicia while said first and second portions remain secured together adjacent said first and second end edges, whereby variable indicia printed on said obscuring coating are not legible.

2. The foldable mailer intermediate of claim 1, in which said camouflage pattern is return address information.

3. The foldable mailer intermediate of claim 1 in which said obscuring, reflective coating comprises a reflective film.

4. The foldable mailer intermediate of claim 1 in which said obscuring, reflective coating comprises a reflective ink layer.

5. The foldable mailer intermediate of claim 1 in which said obscuring, reflective coating comprises a piece of reflective tape applied to said first surface.

6. A foldable mailer intermediate, comprising: a generally rectangular sheet of card stock having first and second side edges, first and second end edges, and first and second faces; a fold line extending substantially transverse to said side edges and substantially bisecting them, whereby said sheet is divided by said fold line into first and second portions; an adhesive pattern on said first face of said sheet, adjacent at least one of said first and second end edges, for securing said first and second portions together adjacent said first and second end edges, a reflective coating on said first face of said sheet for overprinting with variable indicia, and an image printed on said first face of said sheet, such that the image is reflected from said reflected coating to an observer who separates the said first and second postcard portions adjacent one of said first and second side edges and observes said variable printed indicia while said first and second postcard portions remain secured together adjacent said first and second end edges.

* * * * *